United States Patent [19]
Putschky

[11] 3,936,030
[45] Feb. 3, 1976

[54] ELECTROMAGNETIC VALVE

[75] Inventor: Ernst Putschky, Reichenbach, Germany

[73] Assignee: ITT Industries, Inc., New York, N.Y.

[22] Filed: Oct. 9, 1974

[21] Appl. No.: 513,345

Related U.S. Application Data

[62] Division of Ser. No. 358,278, May 8, 1973, Pat. No. 3,876,177.

[30] Foreign Application Priority Data

May 8, 1972 Germany............................ 2222448

[52] U.S. Cl................................. 251/129; 251/141
[51] Int. Cl.² ........................................... F16K 31/06
[58] Field of Search.................... 251/129, 141, 139

[56] References Cited
UNITED STATES PATENTS

| | | |
|---|---|---|
| 3,114,532 | 12/1963 | Gray et al....................... 251/129 X |
| 3,250,293 | 5/1966 | Adams et al.................... 251/129 X |
| 3,381,931 | 5/1968 | Boonshaft et al............... 251/129 X |
| 3,469,590 | 9/1969 | Barker............................. 251/129 X |
| 3,529,620 | 9/1970 | Leiber............................. 251/129 X |
| 3,531,080 | 9/1970 | Dillon .................................. 251/129 |

FOREIGN PATENTS OR APPLICATIONS

698,160   11/1964   Canada.............................. 251/141

*Primary Examiner*—Arnold Rosenthal
*Attorney, Agent, or Firm*—A. Donald Stolzy

[57] ABSTRACT

An electromagnetic valve including a splined or other similar external adjustment member for setting a valve member location on the armature, or spring pressure on the armature.

4 Claims, 3 Drawing Figures

ELECTROMAGNETIC VALVE

This application is a division of copending parent application Ser. No. 358,278 filed May 8, 1973, now U.S. Pat. No. 3,876,177. The benefit of the filing date of said copending application is, therefore, hereby claimed for this application.

BACKGROUND OF THE INVENTION

This invention relates to fluid flow control devices, and more particularly, to a solenoid valve or the like wherein the armature of an electromagnet, when energized, urges a valve member onto or off of a valve seat.

Prior art valves are often used in hydraulic device and pressure regulator applications. Using such devices, pressure regulation and flow rate control may be accomplished by controlling the voltage impressed across the electromagnetic winding. In contrast to other prior art are valves wherein the valve was separated from the electromagnet and a mechanical connection had to be first established by a resilient intermediary member, the said other prior art valves were integrally formed. This was true because the valve member formed a spacer between the armature and the yoke. The spacer established an air gap. It is true that this arrangement does not make maximum use of the force of the electromagnet. On the other hand, this method permits positive control of the discharge pressure or of the amount of discharge pressure medium, respectively, because it is by means of the high magnetic reluctance in the air gap that operation in the lower area of the electromagnet's travel/force characteristic is possible. Within the said lower area, the travel/force characteristic curve runs approximately in parallel to the travel axis. This results in always well-defined travel/force intersection points following each other in an almost linear sequence under varying degrees of energization of the electromagnet. This method also avoids the need for a spring between the armature and the valve member, required previously. In the said other valve, the pressure of the valve member bearing upon the valve seat was determined exclusively by the electromagnetic field strength. Thus, if the magnet were suitably designed, the said field strength varied in proportion to the voltage applied to the electromagnet.

When manufacturing the said other valves, there were only two points to be observed regarding the travel/force characteristic:

1. Observance of a given air gap; and
2. Adequate design of the electromagnet.

If the air gap were too small, the valve would operate within the range of an already considerably curved characteristic; and if it were too large, the electromagnetic force would not suffice to control the valve in accord with the given characteristic.

If the design of the electromagnet were inadequate, i.e. if the electromagnetic field were too strong, the valve would operate within the range of an already considerably curved characteristic, and if it were too weak, the electromagnetic forces would not be sufficient to control the valve.

A conventional electromagnetic valve may sometimes be designed without great difficulty; however, difficulties may arise when an attempt is made to fabricate a valve with an air gap defined between very close tolerances.

SUMMARY OF THE INVENTION

In accordance with the device of the present invention, the abovedescribed and other disadvantages of the prior art are overcome by providing a valve by which the air gap can be adjusted.

The present invention thus avoids the necessity for high precision manufacture of the prior art electromagnetic valve, that is, for example, the fabrication of such a valve with a yoke-to-armature spacing between very close tolerances. It will be understood that with gap adjustment, neither manufacture nor operation is restricted.

According to the present invention, air gap adjustment is achieved by inserting the valve member into the armature via longitudinally adjustable members. In this case, the valve member is preferably inserted into a bore in one end of the armature and is longitudinally movable therein, a tapped hole with an adjusting screw engaging with the said bore from the end of the armature opposite the said one end thereof. The valve member is supported by the one end of the adjusting screw so that it is possible for the said screw to urge the valve member out of the armature.

If the armature of the electromagnetic valve of the present invention is constructed in the manner described, the valve member can be quickly inserted following armature manufacture and be adjusted outside the electromagnet later on.

The present invention also provides for an adjusting opening that can be closed in the cover of the electromagnet resting against the armature and through which opening an adjusting screw can be seized and turned.

It is also possible to provide in the electromagnet's cover resting against the armature a pin longitudinally movable and at one end being constructed in the form of a tool adapted to seize the adjusting screw and projecting into the tapped hole of the armature. This is an advantage in that the electromagnetic valve can be adjusted or readjusted, when pressure is applied, i.e. during operating conditions.

Prior art valves were troublesome in use because the valve member thereof often came loose and reduced the speed of response of the valve. The valve of the present invention also overcomes this problem because the valve member thereof is connected firmly although rotatably with the adjusting screw so as to enable the valve member to follow axial adjusting-screw movement.

To avoid turning of the armature when the adjusting screw is turned, the former is suitably secured. It is conventional practice in prior art electromagnetic valves to provide in the armature, with the armature chamber filled with fluid, a damp armature motion. In accordance with the valve of the present invention, a guide pin engaging with the said bore is inserted into the cover resting against the armature. This avoids the need for additional means or bores and provides a simple and inexpensive mechanism for preventing the armature from rotating.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
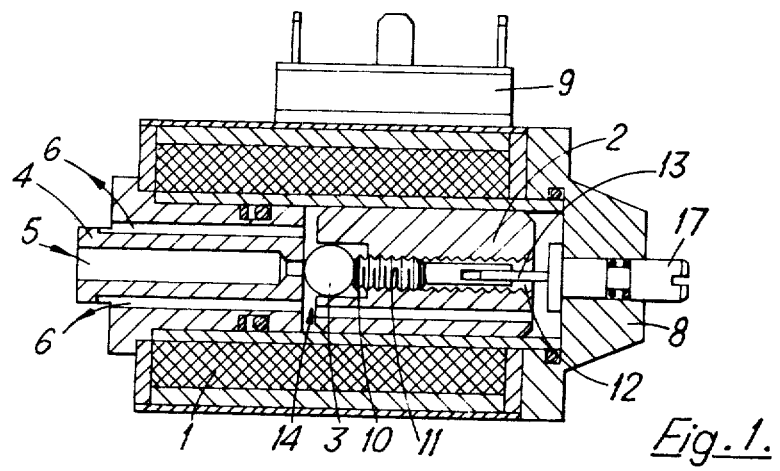
FIG. 1 is a longitudinal sectional view through an electromagnetic valve constructed in accordance with the present invention.

In the drawings, in FIG. 1, an electromagnetic valve, including an electromagnet 1, is illustrated including a hollow, cylindrical working chamber surrounding an armature 2 which may be filled with a fluid.

Armature 2 is longitudinally movable with a ball 3 serving as a valve member. Said working chamber also includes a valve body 4 with inlet 5 and exhausts 6. The exit portion of the inlet 5 where it leaves the valve body 4 is constructed as a valve seat seating the ball 3 as the valve member when the valve is closed. On the other side, the working chamber of the electromagnet 1 is sealed by a cover 8 through which there is extending a pin 17. Mounted on the magnet is also a conventional plug-in unit 9 to supply current to the electromagnet 1.

The ball 3 is confined within a bore 10 of the armature 2. Said ball rests against the front end of an adjusting screw 11 containing a central tapped hole 12 of the armature 2. In engagement with said adjusting screw 11 is a leafshaped extension 13 of the pin 17 permitting the adjusting screw 11 to be turned from the outside through said pin 17. This results in the ball 3 being forced out of or into the bore 10 in the armature 2 so that it is possible to adjust the air gap 14 between the front ends of the valve body 4 serving as the yoke and the armature 2.

Figure 2:
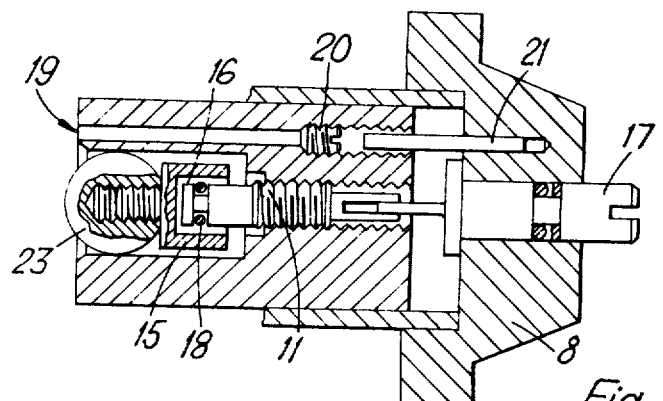
FIG. 2 is a longitudinal sectional view through an armature of a second embodiment of the present invention.

In order to always obtain a defined valve member position, the valve member is firmly, yet rotatably, connected with the adjusting screw 11. As shown in FIG. 2, this can be achieved by threading a bushing 15 into a ball 23 serving as a valve member, with an adjusting screw 11' projecting into said bushing. The end of the adjusting screw 11' includes a collar 16 behind which there are situated two slotted pins 18 passing through the bushing 15. In this case, the ball 23 is firmly connected with the adjusting screw 11' without, however, impairing its rotation.

Furthermore, FIG. 2 shows an eccentric bore 19 passing through the armature 2 and containing a damping nozzle 20. A guide pin 21, e.g. press fit into the cover 8 projects into said eccentric bore 19 into which it is slidable. Guide pin 21 thus prevents an armature 2 from rotating when the adjusting screw is turned.

Figure 3:
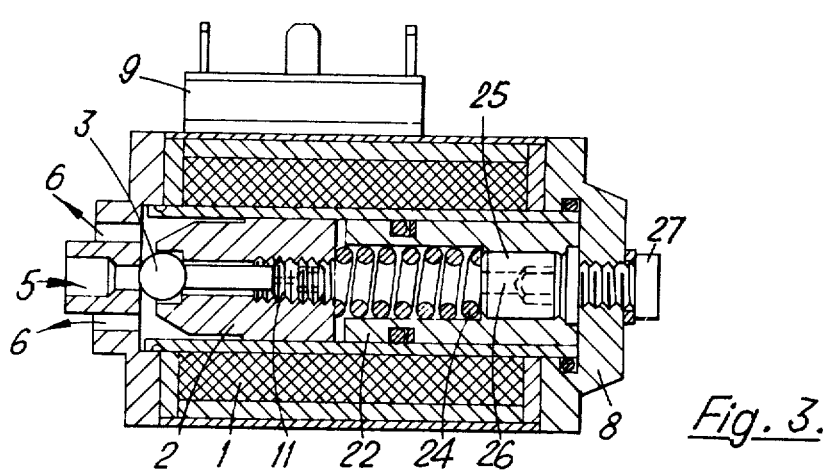
FIG. 3 is a longitudinal sectional view through a third embodiment of the present invention.

In contrast to the progressively acting electromagnetic valve shown in FIG. 1, FIG. 3 shows a degressively acting electromagnetic valve where the valve will be opened when a voltage is applied to the electromagnet. This embodiment, too, permits adjustment of the air gap between a yoke 22 and an armature 2" in the previously described manner, i.e., by means of an adjusting screw 11". This embodiment does not require the valve member to be connected with the adjusting screw 11". In this embodiment, the valve member 3' will always be urged back onto the valve seat by the force of a spring 24. In the electromagnetic valve shown it is furthermore possible to change the contact pressure through a hexagon socket screw 25 in such a way that after removal of a sealing screw 27 in the cover 8, it will be possible to pass a tool through the opening thus created and through the bore 26 to permit turning of the adjusting screw 11". At the same time, the screw 25 can also be turned if so required, thus causing the contact pressure of the spring 24 bearing on the armature to be changed.

What is claimed is:

1. A valve assembly comprising: first means defining a chamber; a ferromagnetic armature guided for movement in said chamber; a member in said chamber mounted on said armature, said member being adjustable in first and second directions to move said member in third and fourth directions, respectively, relative to said armature; a body mounted on said first means providing a valve seat having an inlet opening therethrough; a solenoid-like winding fixed relative to and around said first means in a position to cause, when energized, movement of said armature from a first position thereof to a second position thereof; and second means movable with said member to abut said valve seat and to close said inlet opening, abutment of said second means with said valve seat taking place when said member is in a predetermined position, the position of said armature relative to said valve seat when said abutment takes place being changeable by adjustment of said member, said first means defining a chamber which is cylindrical, said armature being cylindrical at least in part to slide in said cylindrical chamber, said member being one portion of a valve, said second means being integral with said member and being the remainder of said valve over said one portion thereof, said armature having at least a partially screw-threaded passageway, said passageway extending completely therethrough, said member including a set screw threaded into and rotatably in said passageway, said valve being located on said set screw at one end thereof near one end of said armature, the other end of said set screw having a construction for engagement with a first device to rotate the said set screw, said armature having a cylindrical axis, and third means pivoting said valve relative to and on said set screw about an axis approximately normal to said armature axis.

2. A valve assembly comprising: first means defining a chamber; a ferromagnetic armature guided for movement in said chamber; a member in said chamber mounted on said armature, said member being adjustable in first and second directions to move said member in third and fourth directions, respectively, relative to said armature; a body mounted on said first means providing a valve seat having an inlet opening therethrough; a solenoid-like winding fixed relative to and around said first means in a position to cause, when energized, movement of said armature from a first position thereof to a second position thereof; and second means movable with said member to abut said valve seat and to close said inlet opening, abutment of said second means with said valve seat taking place when said member is in a predetermined position, the position of said armature relative to said valve seat when said abutment takes place being changeable by adjustment of said member, said first means defining a chamber which is cylindrical, said armature being cylindrical at least in part to slide in said cylindrical chamber, said member being one portion of a valve, said second means being integral with said member and being the remainder of said valve over said one portion thereof, said armature having at least a partially screw-threaded passageway, said passageway extending completely therethrough, said member including a set screw threaded into and rotatably in said passageway, said valve being located on said set screw at one end thereof near one end of said armature, the other end of said set screw having a construction for engagement with a first device to rotate the said set screw, said first means including a plate having a hole extending completely therethrough, a shaft rotatable in said plate hole having one end in engagement with said member to rotate the same therewith and to adjust the same by said rotation.

3. The invention as defined in claim 2, wherein the other end of said shaft has a construction to permit engagement therewith by a tool adapted to rotate the same.

4. A valve assembly comprising: first means defining a chamber; a ferromagnetic armature guided for movement in said chamber; a member in said chamber mounted in said armature, said member being adjustable in first and second directions to move said member in third and fourth directions, respectively, relative to said armature; a body mounted in said first means providing a valve seat having an inlet opening therethrough; a solenoid-like winding fixed relative to and around said first means in a position to cause, when energized, movement of said armature from a first position thereof to a second position thereof; and second means movable with said member to abut said valve seat and to close said inlet opening, abutment of said second means with said valve seat taking place when said member is in a predetermined position, the position of said armature relative to said valve seat when said abutment takes place being changeable by adjustment of said member, said first means defining a chamber which is cylindrical, said armature being cylindrical at least in part to slide in said cylindrical chamber, said member being one portion of a valve, said second means being integral with said member and being the remainder of said valve over said one portion thereof, said armature having at least a partially screw-threaded passageway, said passageway extending completely therethrough, said member including a set screw threaded into and rotatably in said passageway, said valve being located on said set screw at one end thereof near one end of said armature, the other end of said set screw having a construction for engagement with a first device to rotate the said set screw, said first means including a housing wall having a hole therethrough, and means extending through said hole in engagement with said member, said last named means being movable for adjustment of said member.

* * * * *